Dec. 2, 1952     L. L. CHIVILLE, JR     2,619,850
HYDRAULIC TRANSMISSION

Filed Aug. 12, 1948     4 Sheets-Sheet 1

Inventor:
Leslie L. Chiville Jr.

Dec. 2, 1952 L. L. CHIVILLE, JR 2,619,850
HYDRAULIC TRANSMISSION
Filed Aug. 12, 1948 4 Sheets-Sheet 2

Inventor:
Leslie L. Chiville Jr.,
By Chritton, Schroeder,
Merriam & Hofgren, Attys.

Dec. 2, 1952 L. L. CHIVILLE, JR 2,619,850
HYDRAULIC TRANSMISSION
Filed Aug. 12, 1948 4 Sheets-Sheet 3
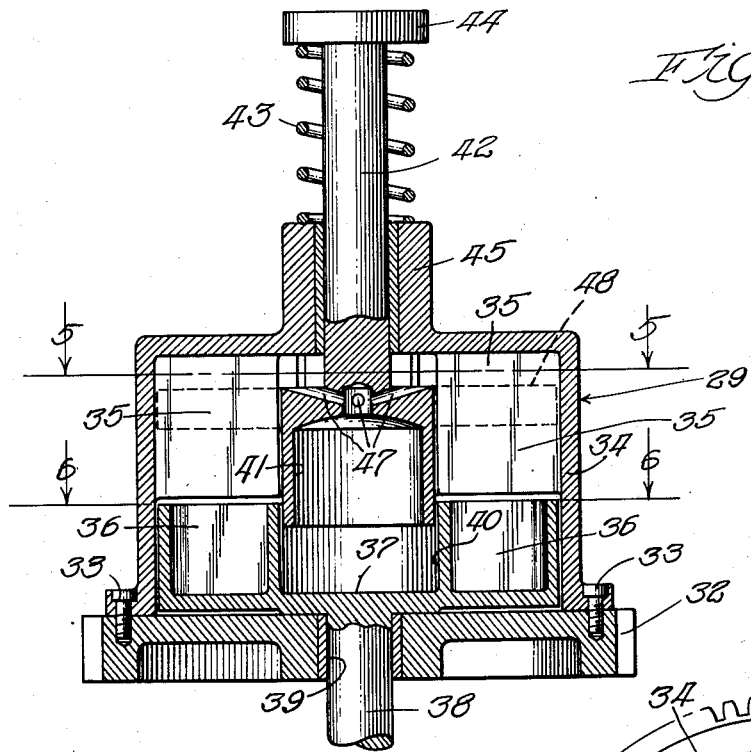
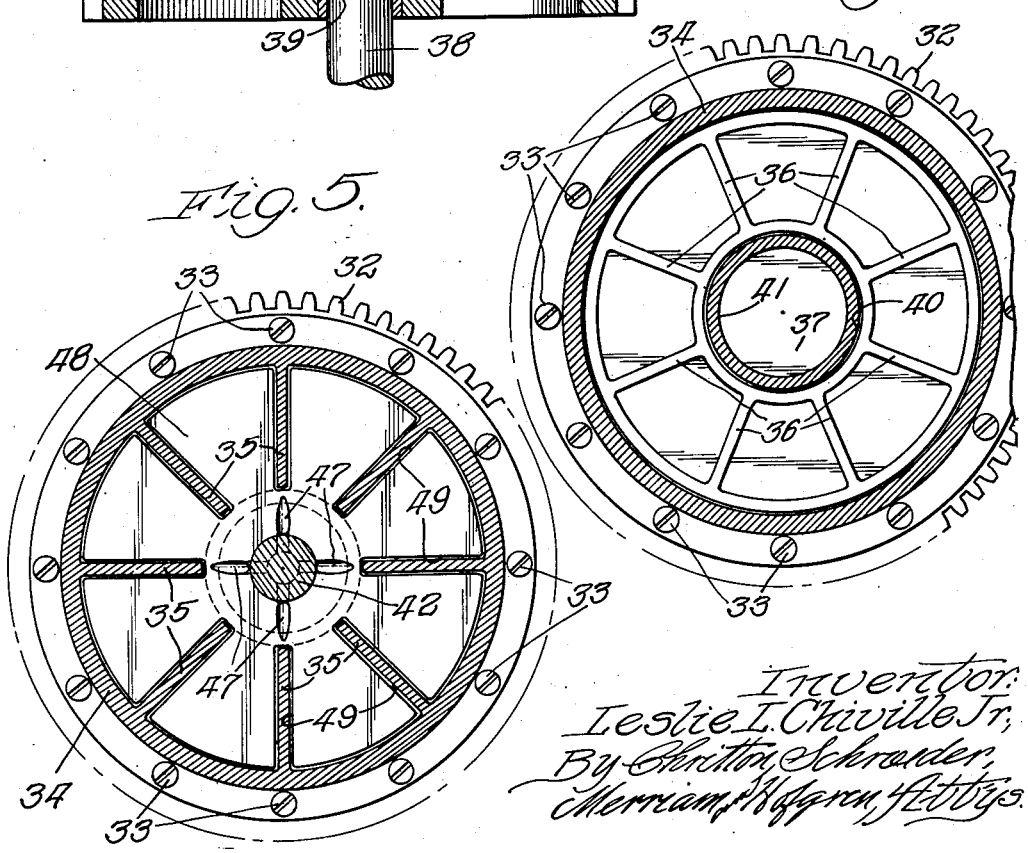
Inventor:
Leslie L. Chiville Jr,
By Britton, Schrader,
Merriam & Hofgren, Attys.

Dec. 2, 1952     L. L. CHIVILLE, JR     2,619,850
HYDRAULIC TRANSMISSION
Filed Aug. 12, 1948     4 Sheets-Sheet 4
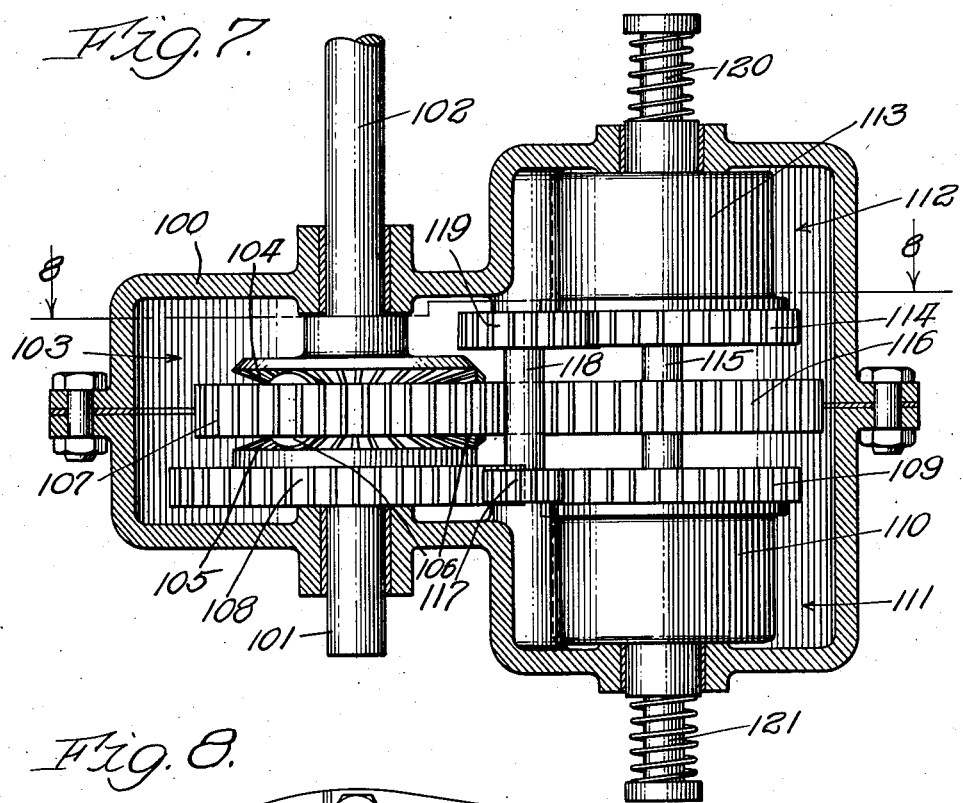
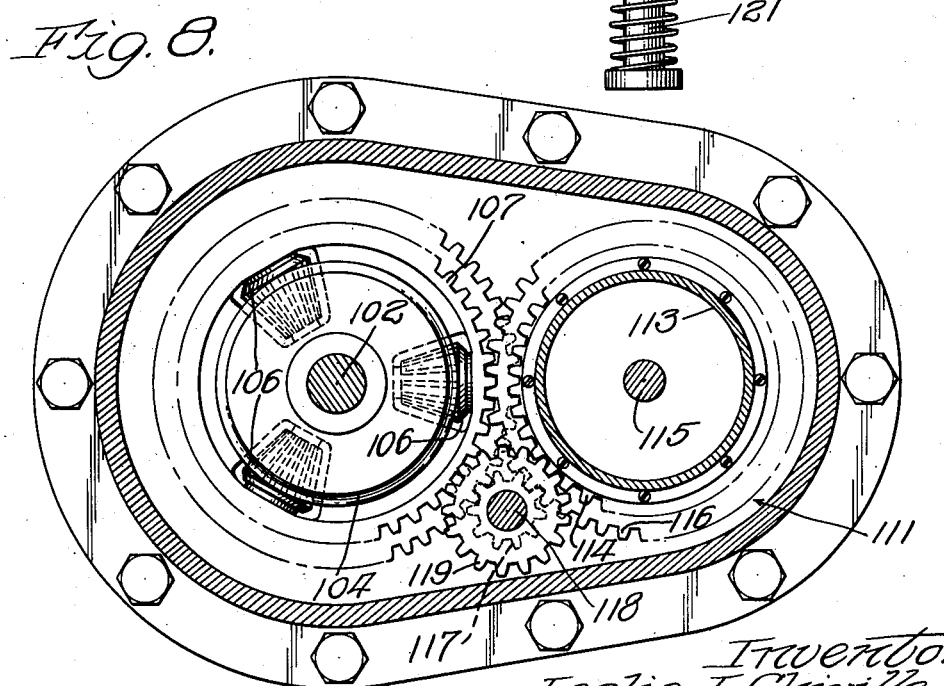
Inventor:
Leslie L. Chiville Jr.
By Chritton, Schroeder,
Merriam & Holgren, Attys.

Patented Dec. 2, 1952

2,619,850

UNITED STATES PATENT OFFICE 2,619,850

HYDRAULIC TRANSMISSION

Leslie L. Chiville, Jr., Carpentersville, Ill.

Application August 12, 1948, Serial No. 43,793

9 Claims. (Cl. 74—688)

1

This invention relates to a hydraulic transmission and more particularly to a hydraulic transmission for regulating the speed of one shaft relative to the speed of a second shaft. Either of the shafts may be independently driven or may be driven from a single prime mover. Regardless of the source of power, the transmission of this invention may be employed to adjust and maintain the speed of one shaft above or below or at the same speed of the other shaft.

The transmission of this invention may be used with advantage in a helicopter having contra-rotating rotors and in which one rotor is driven by jet units on the rotor. In another embodiment, the transmission of this invention may be used in a helicopter which is driven by an internal combustion engine attached to a drive shaft or may be used in an automotive transmission for transmitting power from a drive shaft to a driven shaft.

Figure 1:
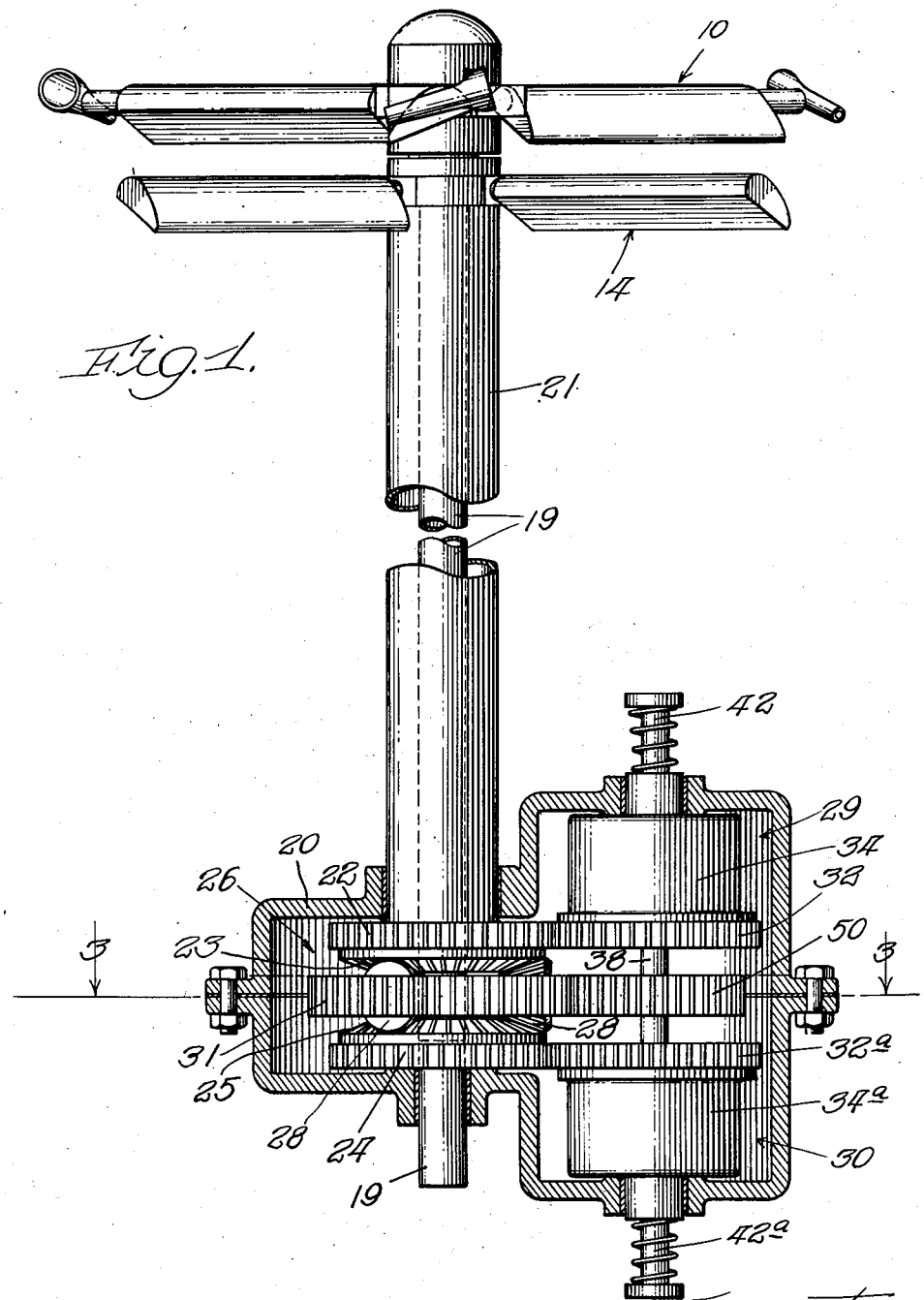
Figure 2:
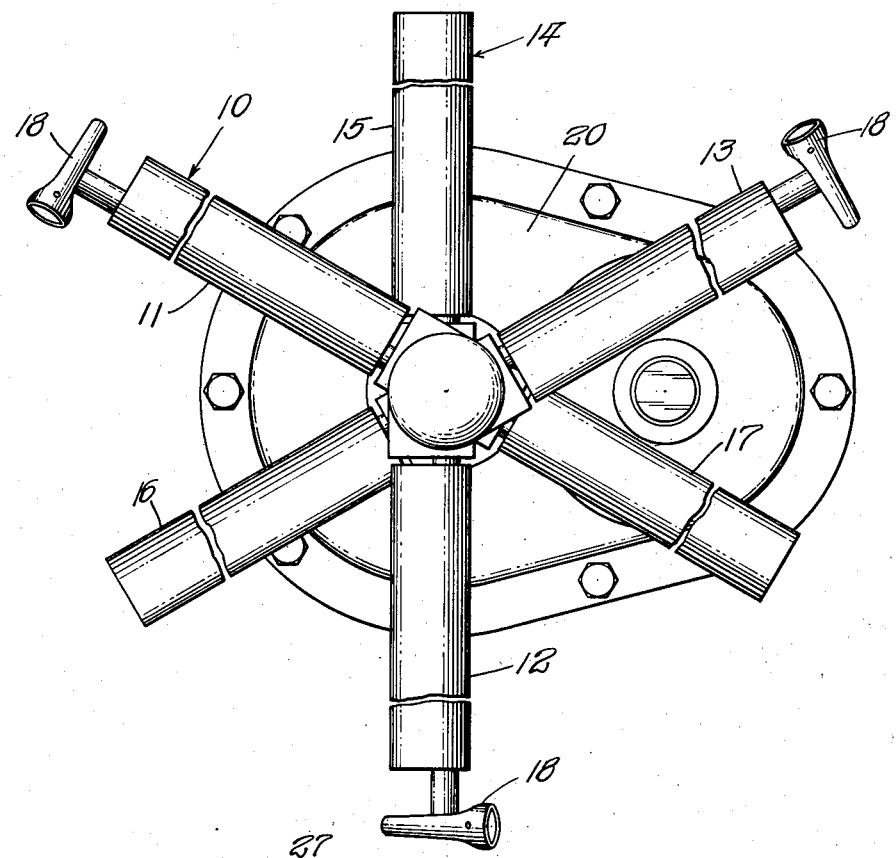
Figure 3:
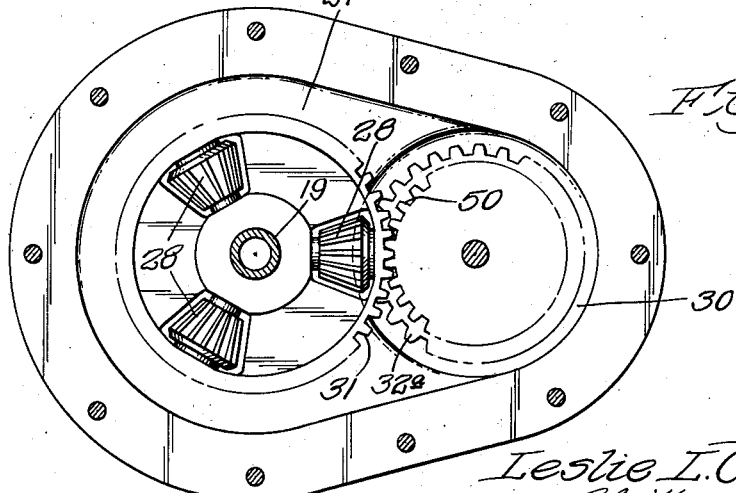

In the drawings, Fig. 1 is a side elevation partly in section showing my hydraulic transmission attached to the drive shafts carrying helicopter rotors; Fig. 2 is a top plan view of the device of Fig. 1; Fig. 3 is a horizontal section along line 3—3 of Fig. 1; Fig. 4 is an enlarged vertical section of one element of the hydraulic transmission; Figs. 5 and 6 are horizontal sections along lines 5—5 and 6—6 of Fig. 4, respectively. Fig. 7 is a sectional view of a modified form of the device and Fig. 8 is a vertical section along line 8—8 of Fig. 7.

Referring now to the drawings, 10 indicates a first rotor having blades 11, 12 and 13, and 14 indicates a second rotor having blades 15, 16 and 17. The rotor 10 is equipped with jet units 18 located at the outer extremity of each blade. In the particular embodiment chosen for an exemplary disclosure the jet units 18 comprise the only source of power for rotating both rotors although it will be obvious from the following description that similar jet units may be attached to the rotor 14 or that the rotor may be driven by an internal combustion engine or other source of power.

The rotor 10 is mounted at the end of a preferably hollow drive shaft 19 rotatably mounted in a housing 20 while the rotor 14 is mounted upon a drive shaft 21 similarly rotatably mounted in the housing 20. It will be noted that the shaft 21 is hollow with the shaft 19 extending therethrough and fuel lines for the jet units 18 together with control rods for varying the pitch of the rotors may also be enclosed within the shafts 19 and 21.

Fixed to the end of the shaft 21 is a spur gear 22 and a beveled gear 23 and a similar spur gear 24 is fixed to the shaft 19 as well as another beveled gear 25. The beveled gears 23 and 25 constitute part of a planetary gear system 26 which

2 is in the familiar form of a planet carrier or spider 27 carrying three rotatably mounted beveled planet gears 28. The gears 28 mesh with each of the beveled gears 23 and 25 and the spider 27 is mounted for free rotation on the shaft 19. The spider 27 is provided with external teeth thereon to form a gear 31.

While I have shown one type of planetary gear system 26 it will be obvious that other types may be used and I do not intend to limit the invention to the particular type of planetary system shown.

At the right hand portion of the housing 20 is located my hydraulic transmission comprising a pair of identical transmission units 29 and 30. As these units are identical only one of which (29) will be described.

A spur gear 32 is in mesh with the gear 22 and has affixed thereto as by the bolts 33 a fluid chamber 34. A plurality of vanes 35 are fixed to the interior of the chamber 34 and are arranged about the periphery of the chamber, that is, are arranged in the form of a circle within the circular chamber 34. A second set of vanes 36 is located within the chamber and fixed to a rotatable member 37. The member 37 is connected to a shaft 38 which extends through an opening 39 in the gear 32 and about which shaft the gear 32 is rotatable. The vanes 35 and 36 are so arranged within the chamber 34 as to provide a central cylindrical opening 40 therebetween. Located in the opening 40 is an inverted cup shaped member 41 to prevent cross flow of liquid. The member 41 is connected to a control rod 42 and movable by means of the control rod axially of the chamber 34. A compression spring 43 is located between a collar 44 on the control rod and a tubular extension 45 of the housing and through which the rod 42 extends. A plurality of openings 47 are provided in the member 41 to permit fluid to return to the upper part of the chamber 34 with vertical movement of the cup. Attached to the cup member 41 and movable therewith is a disk 48 having a diameter approximately equal to the inside diameter of the chamber 34 and provided with a plurality of slots 49 through which the vanes 35 extend.

The shaft 38 extends into the second hydraulic unit 30 in which it is attached to a vaned member similar to the member 37 in the chamber 29. Fixed to the shaft 38 intermediate the two chambers is a gear 50 which meshes with the gear 31 on the planet carrier.

True neutral, in which rotor 10 is rotating while rotor 14 is stationary, may be achieved by manipulation of the control rods 42 and 42a. With both those control rods fully depressed so as to expose no part of the vanes fixed to the shaft 38 to fluid driven by the vanes fixed to the chambers, the planet carrier should rotate at one half the speed of the shaft 19 and theoretically, no rotation will be imparted to the shaft 21. Actually, with the control rods so depressed, there will be a tendency for the planet carrier 27 to rotate at somewhat less than half the speed of the shaft 19 and hence to cause the rotor 14 to rotate slowly in the opposite direction to the rotor 10. This tendency may be overcome by moving the control rod 42a slightly, thus exposing the vanes fixed to the shaft 38 to the action of the vanes fixed to the fluid chamber 34a. As the gear 32a is rotating faster than the gear 50, movement of the control rod 42a tends to urge the shaft 38 to rotation in the same direction as the gear 32a and accelerate the rotation of the gear 31 and transmission 26 to a speed equal to one half of the rotation of the shaft 19 and thereby halt the rotation of the rotor 14.

If it is desired to drive the rotor 14 in the opposite direction but at the same speed as the rotor 10, the control rod 42 may be moved upward to expose the vanes 36 to the action of the fluid moved by the vanes 35. Such movement of the control rod 42 tends to decelerate the rotation of the shaft 38 and hence the planet carrier to start the rotor 14 rotating slowly in a direction opposite to the rotation of the rotor 10 and the gear 32 and the chamber 34 will also commence to rotate in a direction opposite the rotation of the gear 32a and the chamber 34a. With such rotation of the transmission 29, the shaft 38 is further decelerated until a point is reached where that shaft is stationary and the planet carrier 26 is also stationary. When this condition exists the shaft 21 will be rotating in a direction opposite to the rotation of the shaft 19 but at the same speed. Movement of the control rod 42a upwards and downwards from this position will cause the rotor 14 to rotate at a faster or slower rate than the rotor 10.

My transmission may also be used where the rotors are to be driven by an internal combustion engine attached to the shaft 19 and it may be used in an automotive transmission to control the rotation of a driven shaft relative to the rotation of a drive shaft. For this latter type of construction I prefer to use a slight modification of the device, such modified embodiment being shown in Figs. 7 and 8.

Referring to those figures, I show a housing 100 in which is rotatably mounted a drive shaft 101 and a driven shaft 102. A planetary gear system 103 is interposed between said shafts, said planetary gear system comprising a beveled gear 104 mounted on the end of the driven shaft 102, a beveled gear 105 mounted on the drive shaft 101 with each of the gears 104 and 105 engaging three beveled gears 106 rotatably mounted on a planet carrier therebetween. A gear 107 having external teeth is mounted upon the planet carrier. A spur gear 108 is mounted on the drive shaft 101 as shown and engages a gear 109 secured to a fluid chamber 110 on a hydraulic transmission 111. The transmission 111 is similar in all respects to the transmission 29 previously described. A second similar transmission 112 is located in the housing 100 having a fluid chamber 113 rotated by a spur gear 114. A shaft 115 is connected to the rotatable vanes within each of the transmissions and has thereon mounted a spur gear 116 meshing with the gear 107 on the planet carrier. A comparatively small spur gear 117 is mounted upon a rotatable shaft 118 and meshes with the gear 108 but not with the gear 109. Also fixed to the shaft 118 is a spur gear 119 meshing with a gear 114.

Power applied to the drive shaft 101 causes rotation of the gear 108 and hence of the gears 109 and 114 associated with each of the fluid transmissions. The rotation of the gears 109 and 114 however will be opposite to each other by virtue of the arrangement just described.

In neutral position, the planet carrier will rotate at half the speed of the drive shaft 101 and will transmit no power to the driven shaft 102. If it is desired to rotate the driven shaft 102 in a direction opposite to the rotation of the shaft 101 the control rod 120 associated with the transmission 112 may be moved upwardly to the position shown while the control rod 121 associated with the transmission 111 is moved downwardly to a position wherein the rotatable vanes are not subject to the action of the fluid moved by the vanes fixed to the fluid chamber 110. The position of the control rod 120 may be so adjusted so that the vanes in the chamber 113 and fixed to the shaft 115 are exposed to fluid propelled by the vanes fixed to the chamber to urge the shaft 115 toward rotation in a direction opposite to the direction of rotation in which it is urged by the planet carrier 107. If the shaft 120 is properly adjusted so that such rotational forces are opposite and equal, the shaft 115 is held stationary and hence the planet carrier is similarly stopped. In this position the driven shaft 102 will rotate at the same speed but in the opposite direction to the shaft 101. Further adjustment of the control rod 120 is adapted to cause the shaft 115 to rotate in the same direction as the gear 114 and thereby to cause the planet carrier to rotate in a direction opposite to the rotation of the drive shaft 101. When this condition exists the driven shaft will be driven at a greater speed and in the opposite direction to the drive shaft.

When it is desired to rotate the driven shaft in the same direction as the drive shaft the control rod 120 may be depressed so as to render the transmission 112 inoperative and the control rod 121 may be moved upwardly to expose the rotatable vanes to the action of the fluid impelled by the vanes fixed to the chamber 110. Such action will urge the shaft 115, which in neutral is rotating in the same direction as the gear 109 but at the slower speed, to increase its speed of rotation and hence to rotate the planet carrier at a speed greater than one-half the speed of rotation of the drive shaft. When this condition occurs the driven shaft 102 will commence to rotate in the same direction as the drive shaft. The control rod 121 may be so adjusted until a point is reached wherein the planet carrier is rotating at the same speed as the drive shaft and hence the driven shaft will rotate at that speed and in the same direction as the drive shaft.

While I have shown and described my invention in its preferred embodiments it is to be understood that it is capable of many modifications. Changes, therefore, in the construction and arrangement may be made without departing from the spirit and scope of the invention as disclosed in the appended claims.

I claim:

1. Apparatus of the character described comprising a drive shaft, a driven shaft, a planet carrier positioned between said shafts and rotatably supporting a plurality of planet gears, a gear on the drive shaft and a gear on the driven shaft, said last named gears being positioned on opposite sides of and meshing with the planet gears, a rotatable chamber containing hydraulic fluid, means for rotating said chamber in a relative direction reverse to the direction of rotation of the drive shaft, a plurality of impeller vanes attached to the interior of the chamber, rotor means rotatable within the chamber and adapted to be rotated by fluid propelled by the vanes, means for controlling the amount of fluid propelled by the vanes including a disk within the chamber and conforming substantially to the shape thereof, said disk having a plurality of slots with a vane positioned in each slot, means for moving said disk axially of the chamber to control the area of the vanes on either side of the disk, and means connecting the rotor with the planet carrier to control the speed of rotation thereof.

2. Apparatus of the character described in claim 1 in which said vanes are attached at spaced intervals to the inner periphery of the chamber to provide a central cylindrical fluid passage, an inverted cup in the passage having the disk attached thereto with the edges of the cup having a length approximately equal to the length of the vanes, fluid passages in the upper portion of the cup, and a rod attached to the cup for moving the cup and disk axially of the chamber.

3. Apparatus of the character described comprising a drive shaft, a driven shaft, a planet carrier positioned between said shafts and rotatably supporting a plurality of planet gears, a gear on the drive shaft and a gear on the driven shaft, said last named gears being positioned on opposite sides of and meshing with the planet gears, means defining a pair of fluid chambers each containing fluid, impeller vanes in each chamber, means connecting the vanes to the drive shaft to rotate the vanes in the first chamber in a direction opposite to the direction of rotation of the vanes in the second chamber with rotation of the drive shaft, rotor means in each chamber, means connecting each rotor means with the planet carrier, and control means in each chamber for controlling the amount of fluid propelled by the vanes therein whereby a control the speed of rotation of the planet carrier relative to the drive shaft.

4. Apparatus of the character described in claim 3 in which said means for connecting the rotors to the planet carrier comprise a shaft secured to each rotor, a gear fixed on the shaft, and a gear formed on the planet carrier and meshing with said last named gear.

5. In a system having a drive shaft, a gear thereon, a driven shaft, a gear on the driven shaft, and a planet carrier rotatably supporting a plurality of planet gears meshing with said gears and operatively interposed between the drive shaft and driven shaft, means for controlling the operation of the planet carrier comprising a chamber containing fluid, a fluid impeller in the chamber, means connecting the impeller to the drive shaft to rotate the impeller, a second fluid chamber containing fluid, a second fluid impeller in the last mentioned chamber, reverse means connecting the second impeller to the drive shaft to rotate the second impeller in a direction opposite to the direction of rotation of the first impeller, rotor means rotatable in response to fluid moved by the impellers, a rotor shaft rotated by the rotor means, and means connecting the shaft to the planet carrier.

6. Apparatus of the character described in claim 5 including control means for each impeller operable to vary the amount of fluid propelled thereby against the rotor whereby to control the speed and direction of rotation of said rotor shaft.

7. Apparatus of the character described in claim 6 in which said impellers include a plurality of vanes fixed to each fluid chamber, each of said chambers being rotated by said drive shaft and in which said control means for each impeller comprises a disk in each fluid chamber having slots with the vanes disposed in the slots, said disk being movable axially of the chamber to vary the area of said vanes exposed to drive fluid against said rotor means.

8. Apparatus of the character described comprising a drive shaft, a driven shaft, a planet carrier positioned between said shafts and rotatably supporting a plurality of planet gears, a gear on the drive shaft and a gear on the driven shaft, said last named gears being positioned on opposite sides of and meshing with the planet gears, means defining a first and a second fluid chamber each containing fluid impeller vanes in each chamber, means connecting the vanes in one of the chambers to the drive shaft to rotate the vanes therein in one direction, means including at least one of said gears for connecting the vanes in the second chamber to the drive shaft to rotate the same in a direction opposite to the direction of rotation of the vanes in the first chamber with rotation of the drive shaft, rotor means in each chamber, means connecting each rotor means with the planet carrier to control the rotation thereof, and control means in each chamber for controlling the amount of fluid propelled by the vanes therein whereby to control the speed of rotation of the planet carrier relative to the drive shaft.

9. Apparatus of the character described in claim 1 in which said driven shaft is hollow and in which said drive shaft extends through the driven shaft and including helicopter rotors secured to the drive and driven shafts for rotation in opposite directions with rotation of the drive and driven shafts in opposite directions.

LESLIE L. CHIVILLE, Jr.

REFERENCES CITED

The following references are of record in the file of this patent:

UNITED STATES PATENTS

| Number | Name | Date |
|---|---|---|
| 1,077,454 | Cooke | Nov. 4, 1913 |
| 1,125,593 | Pinckney | Jan. 19, 1915 |
| 1,242,974 | Pinckney | Oct. 16, 1917 |
| 2,133,276 | Ballantyne | Oct. 18, 1938 |
| 2,162,251 | Emrick | June 13, 1939 |
| 2,266,085 | Sanderson | Dec. 16, 1941 |
| 2,515,831 | McFarland | July 18, 1950 |

FOREIGN PATENTS

| Number | Country | Date |
|---|---|---|
| 648,142 | Germany | Mar. 7, 1933 |
| 685,879 | France | Apr. 7, 1930 |